United States Patent [19]
Ishii et al.

[11] Patent Number: 5,225,940
[45] Date of Patent: Jul. 6, 1993

[54] IN-FOCUS DETECTION APPARATUS USING VIDEO SIGNAL

[75] Inventors: Toru Ishii, Hirakata; Masatoshi Itoh; Hidenori Fukuoka, both of Takatsuki, all of Japan

[73] Assignee: Minolta Camera Kabushiki Kaisha, Osaka, Japan

[21] Appl. No.: 843,412

[22] Filed: Feb. 27, 1992

[30] Foreign Application Priority Data

Mar. 1, 1991 [JP] Japan .................................. 3-035901

[51] Int. Cl.$^5$ .............................................. G02B 7/02
[52] U.S. Cl. ................................. 359/823; 250/201.2; 250/201.7; 358/227
[58] Field of Search ............................ 359/822, 823; 250/201.7, 201.2; 358/103, 227; 354/402, 400; 356/384

[56] References Cited

U.S. PATENT DOCUMENTS

| | | | |
|---|---|---|---|
| 4,762,986 | 8/1988 | Suda et al. | 250/201.2 |
| 4,804,831 | 2/1989 | Baba et al. | 250/201.2 |
| 4,904,854 | 2/1990 | Ishide et al. | 250/201 |
| 4,994,920 | 2/1991 | Fujiwara et al. | 358/227 |
| 5,055,665 | 10/1992 | Baba et al. | 250/201.7 |

FOREIGN PATENT DOCUMENTS 63-94212  4/1988  Japan .

Primary Examiner—Loha Ben
Attorney, Agent, or Firm—Price, Gess & Ubell

[57] ABSTRACT

An in-focus detection apparatus used for a video camera includes edge width detector for detecting a plurality of edge widths of an object, and an calculation device for calculating the amount of driving a lens based on the distribution state of these plurality of edge width data. The apparatus uses a video signal and provides the in-focus state of an actual object with a high accuracy without requiring slight movement of a focusing lens.

23 Claims, 19 Drawing Sheets

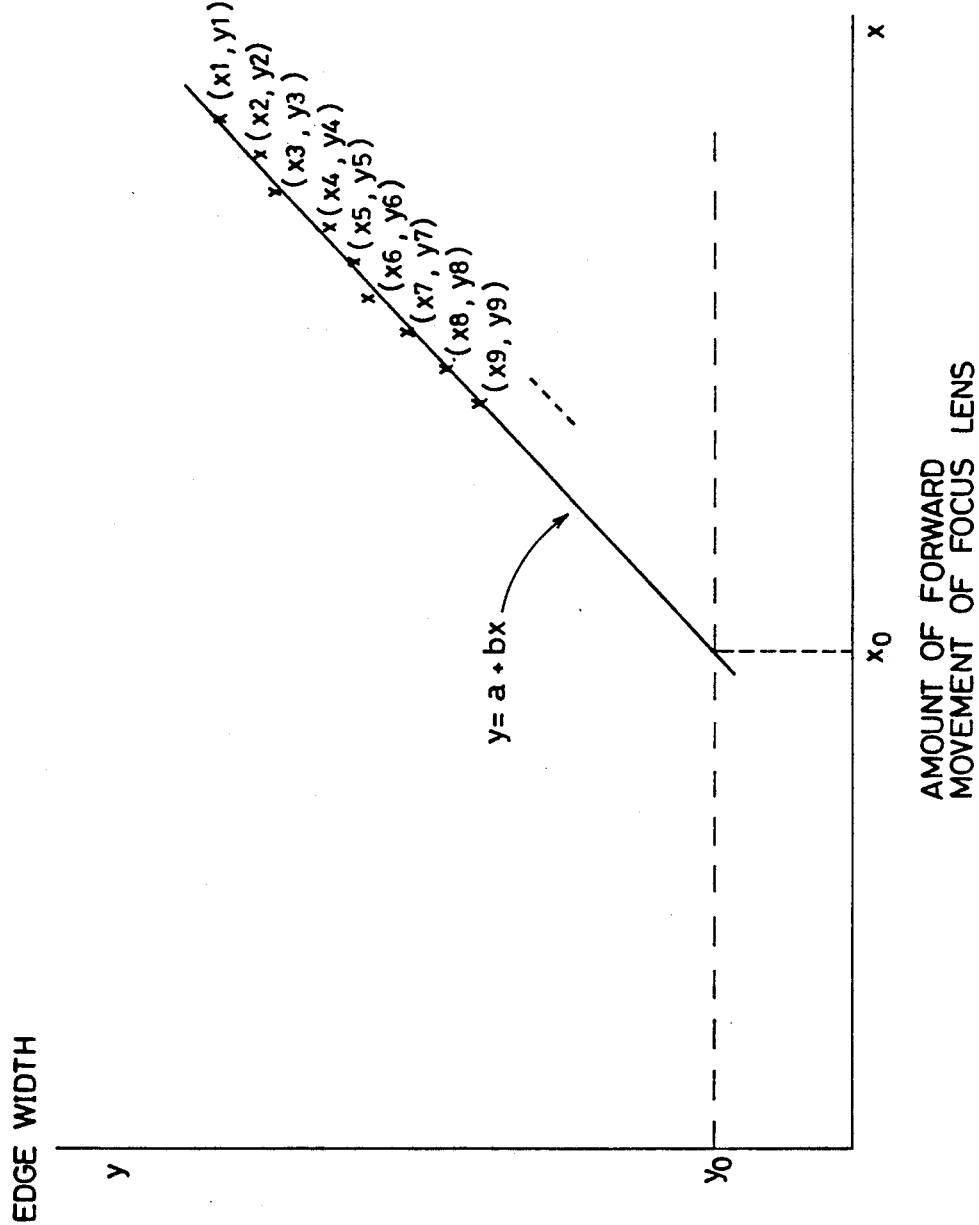

FIG. 6A 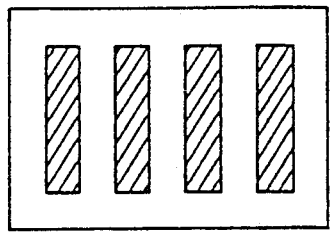 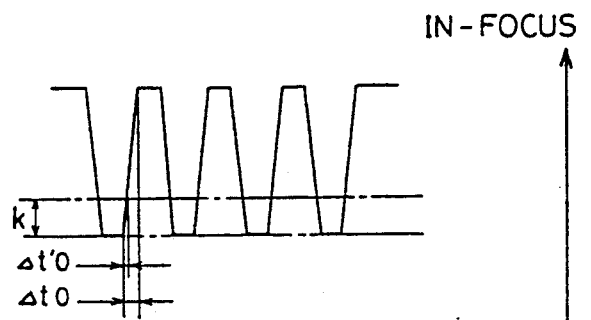
FIG. 6B 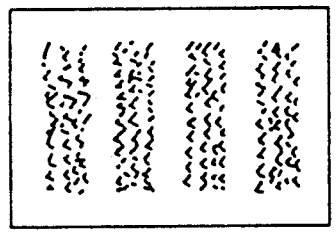 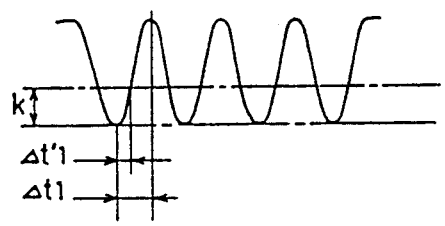

FIG. 6D 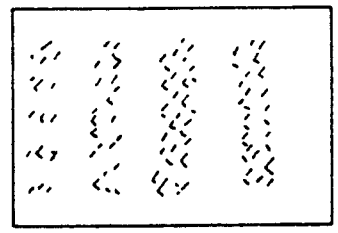 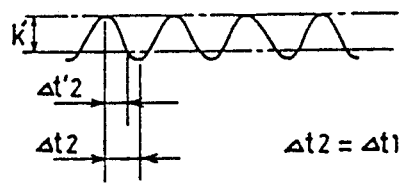
FIG. 6E 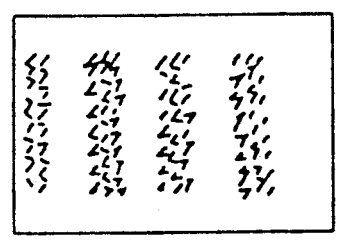 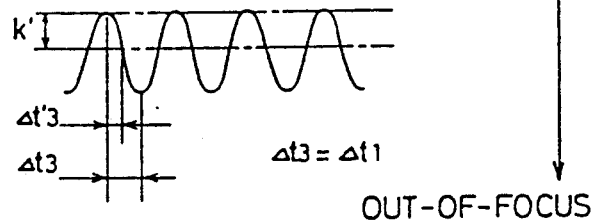

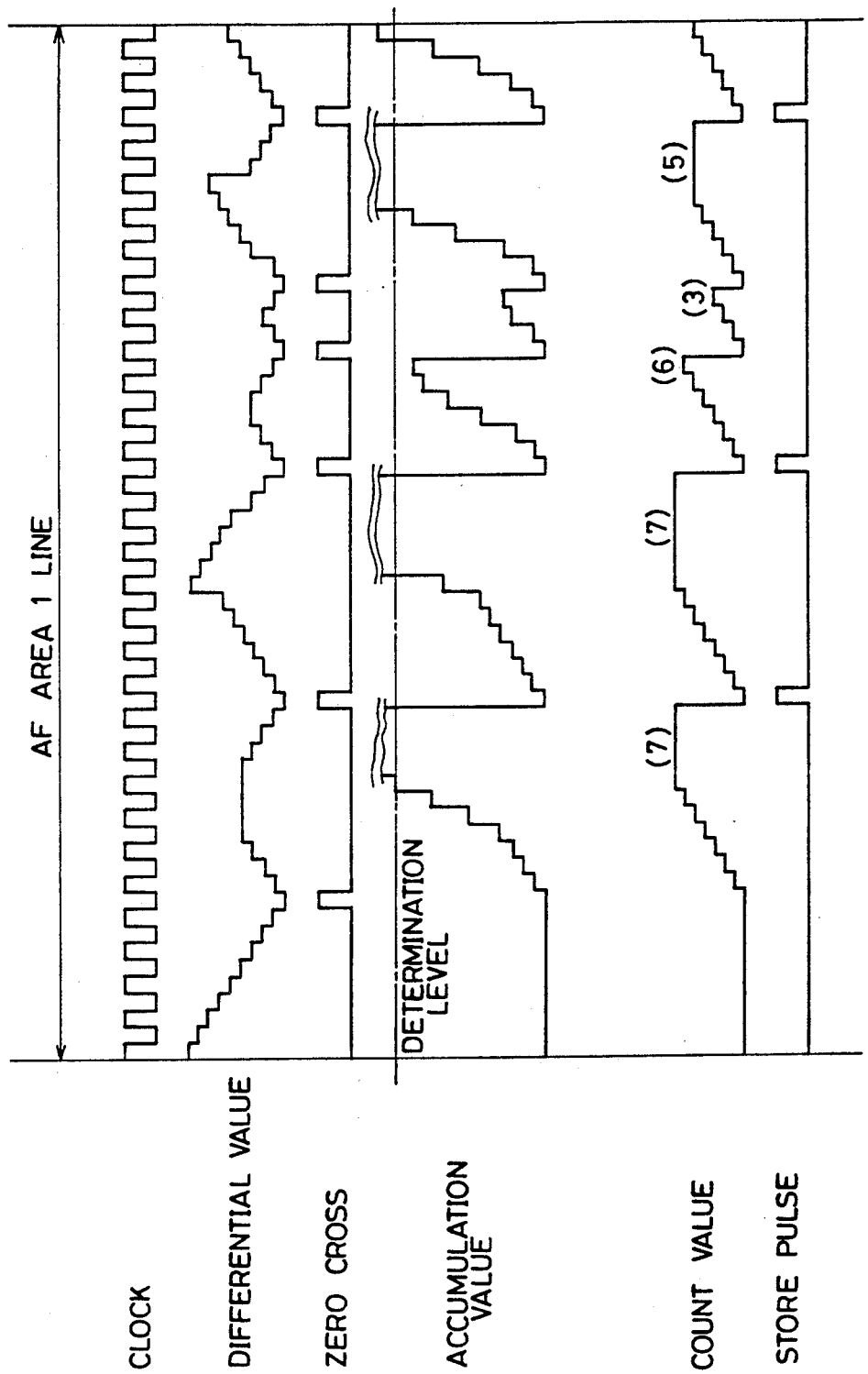

FIG. 15

| AVERAGE EDGE WIDTH yij | WEIGHTING COEFFICIENT Wyij |
|---|---|
| 1 ~ 4 | 1.0 |
| 4 ~ 5 | 0.8 |
| 5 ~ 6 | 0.6 |
| 6 ~ 8 | 0.4 |
| 8 ~ 10 | 0.3 |
| 10 ~ | 0.2 |

FIG. 16A

| 0.3 | 0.4 | 0.4 | 0.4 | 0.4 | 0.4 | 0.3 |
|-----|-----|-----|-----|-----|-----|-----|
| 0.4 | 0.5 | 0.6 | 0.6 | 0.6 | 0.5 | 0.4 |
| 0.4 | 0.6 | 0.8 | 0.8 | 0.8 | 0.6 | 0.4 |
| 0.4 | 0.6 | 0.8 | 1.0 | 0.8 | 0.6 | 0.4 |
| 0.4 | 0.6 | 0.8 | 0.8 | 0.8 | 0.6 | 0.4 |
| 0.4 | 0.5 | 0.6 | 0.6 | 0.6 | 0.5 | 0.4 |
| 0.3 | 0.4 | 0.4 | 0.4 | 0.4 | 0.4 | 0.3 |

FIG. 16B

PRESENT AF AREA

| 0.2 | 0.4 | 0.5 | 0.6 | 0.6 | 0.6 | 0.5 |
|-----|-----|-----|-----|-----|-----|-----|
| 0.2 | 0.4 | 0.6 | 0.8 | 0.8 | 0.8 | 0.6 |
| 0.2 | 0.4 | 0.6 | 0.8 | 1.0 | 0.8 | 0.6 |
| 0.2 | 0.4 | 0.6 | 0.8 | 0.8 | 0.8 | 0.6 |
| 0.2 | 0.4 | 0.5 | 0.6 | 0.6 | 0.6 | 0.5 |
| 0.2 | 0.3 | 0.4 | 0.4 | 0.4 | 0.4 | 0.4 |
| 0.2 | 0.2 | 0.2 | 0.2 | 0.2 | 0.2 | 0.2 |

FIG. 18

| APERTURE VALUE \ β | ~ 1/40 | 1/40 ~ 1/100 | 1/100 ~ |
|---|---|---|---|
| FULL OPEN ↓ 5.6 | 9 (3×3) | 16 (4×4) | 25 (5×5) |
| 5.6 ↓ 11 | 16 (4×4) | 25 (5×5) | 36 (6×6) |
| 11 ↓ | 25 (5×5) | 36 (6×6) | 49 (7×7) |

IN-FOCUS DETECTION APPARATUS USING VIDEO SIGNAL

BACKGROUND OF THE INVENTION

1. Field of the Invention

The present invention relates to an in-focus detection apparatus installed in a video camera, etc. which uses a video signal output from an image sensing device for in-focus operation.

2. Description of the Related Art

Conventionally, cameras used for electrically sensing the image of an object such as a video camera, etc. use an automatic focusing apparatus which detects whether or not an in-focus state is reached using a video signal and uses the detection signal. Most of such devices take advantage of the fact that the high frequency component in the video signal reaches its maximum in the in-focus state. Other apparatuses have been proposed, which conduct in-focus operation using an edge width as an evaluation value, taking into account that the width of the edge portion of an object is shortest in the in-focus state.

FIG. 19 is a representation showing the relation between edge widths and in-focus state. FIG. 19(A) represents the in-focus state, while (B) represents the out-of-focus state. In FIG. 19, frame 30 represents an AF area. For example, in the in-focus state shown in (A), the distribution of the amount of light received by a CCD at a certain edge portion in the AF area is as shown at the bottom. Portions defined by boxes represent the pixels of CCD. In the in-focus state, change from dark (amount of received light being small) to light (amount of received light being large) or change from light to dark takes place with a very small number of pixels. The change of the amount of light received by the CCD in this case is set forth in the center by a graphic representation. In the figure, $\Delta$ represents rising time at the edge portions of an object, and $\Delta$ is defined as the edge width of the object. On the other hand, if the object is in the out-of-focus state, as shown in (B), the edge width $\Delta'$ is larger than that in the case of in-focus state (A).

As described above, according to the method utilizing the high frequency component, the direction in which the high frequency component increases is detected by constantly slightly moving a focus lens, and the position at which the high frequency component reaches its maximum is searched while moving the lens in this direction. And driving of the focus lens is stopped at that position. This method is called mountain climbing method.

According to this method, the focusing lens should be slightly moved all the time. Also, the absolute amount of the peak to be detected is not constant, and, therefore, it is not possible to calculate how much the position of the focus lens at present is shifted from the in-focus state (defocus amount). Furthermore, information obtained by accumulating the amount of light received by the CCD in the area is used, instead of video signals obtained independently for CCD pixels, thus making it difficult to increase in-focus accuracy.

Also according to the method, if an object with edges arranged adjacent to each other like a lattice is sensed in a largely out of focus state, the contrast sometimes indicates the maximum value despite the largely out of focus state, due to the contrast inverted portion of photographing lens MTF characteristic (pseudo peak). According to the mountain climbing method, driving of the focus lens is stopped at this pseudo peak position, and accurate in-focus detection is not possible.

Meanwhile, the method using edge widths can advantageously utilize CCD information. The focusing accuracy is far higher than the above-stated high frequency component method. Furthermore, defocus amounts can be estimated from the detected edge widths.

Although this method is greatly effective when used to sense an ideal object which has edges of one kind, an actual object usually has a various kinds of edge components in the AF area and it is therefore not easy to determine on which edge portion the in-focus determination should be concentrated.

Also in a largely out of focus state, adjacent edges interfere with each other, thus making it difficult to calculate an accurate defocus amount.

SUMMARY OF THE INVENTION

It is a first object of the present invention to provide an in-focus detection apparatus using a video signal which achieves high in-focus accuracy, and allows focusing to an actual object without slight movement of a focus lens.

A second object of the present invention is to provide an in-focus detection apparatus using a video signal, by which in-focus detection can precisely be conducted even in a largely out of focus state.

A third object of the present invention is to provide an in-focus detection apparatus using a video signal free from interference between adjacent edges in a largely out of focus state.

A fourth object of the present invention is to provide an in-focus detection apparatus using a video signal by which driving of a focus lens is not stopped at a pseudo peak position as described above, in an apparatus which detects the contrast of an object and detects its in-focus state according to a so-called mountain climbing method.

A fifth object of the present invention is to provide an in-focus detection apparatus using a video signal which can set an AF area at an arbitrary suitable position in an image sensing plane utilizing detected edge width data, in an apparatus which detects the edge width of an object and detects its in-focus state.

In order to achieve the first object, an in-focus detection apparatus according to the present invention includes means for detecting a plurality of edge widths of an object, and means for calculating the driving amount of a lens based on the distribution state of data of these plurality of edge widths. The distribution state of the edge width data specifically refers to the frequency distribution of the edge widths and frequencies.

In order to achieve the second object, an in-focus detection apparatus according to the present invention includes means for detecting a plurality of edge widths of an object and producing the frequency distribution of the edge widths and frequencies, means for detecting a plurality of contrasts of the object and producing the frequency distribution of these contrast values and frequencies, and means for selecting which frequency distribution should be used for in-focus detection between the edge widths and contrasts depending upon the degree of in-focus.

In order to achieve the third object, an in-focus detection apparatus according to the present invention includes means for detecting a plurality of contrasts of an object, and means for determining the direction of driving a lens based on the distribution state of the data on these plurality of contrasts. The distribution state of the contrast data specifically refers to the frequency distribution of the contrast values and frequencies.

In order to achieve the fourth object, an in-focus detection apparatus according to the present invention includes means for detecting a plurality of edge widths of an object and producing the frequency distribution of the edge widths and frequencies, means for detecting the contrasts of an object, and means for conducting in-focus detection based on both whether or not the edge width is within a prescribed value and whether or not the contrast is the peak.

In order to achieve the fifth object, an in-focus detection apparatus according to the present invention includes means for dividing an image sensing plane into a plurality of small areas, means for detecting the edge widths and the total number of edges of an object for every small area, means for outputting a weighting coefficient in accordance with the position of the area in the plane for every small area, and means for outputting a weighting coefficient in accordance with edge width data in the small area for every small area.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a representation showing the relation between the amount of forward movement of a focus lens and edge widths;

FIGS. 6(A)–(E) are representations showing the relation between the degree of out-of-focus and the luminance difference;

FIG. 7 is a representation schematically showing signals in the respective blocks in FIG. 2 at the time of AF operation in a largely out of focus condition;

FIG. 15 is a representation showing an example of a weighting coefficient set based on a mean edge width;

FIGS. 16(A) and 16(B) are representations showing an example of weighting coefficient set based on the position of a small area in the image sensing plane;

FIG. 18 is a representation showing an AF area when it is reduced; and

DESCRIPTION OF THE PREFERRED EMBODIMENTS

Figure 1:
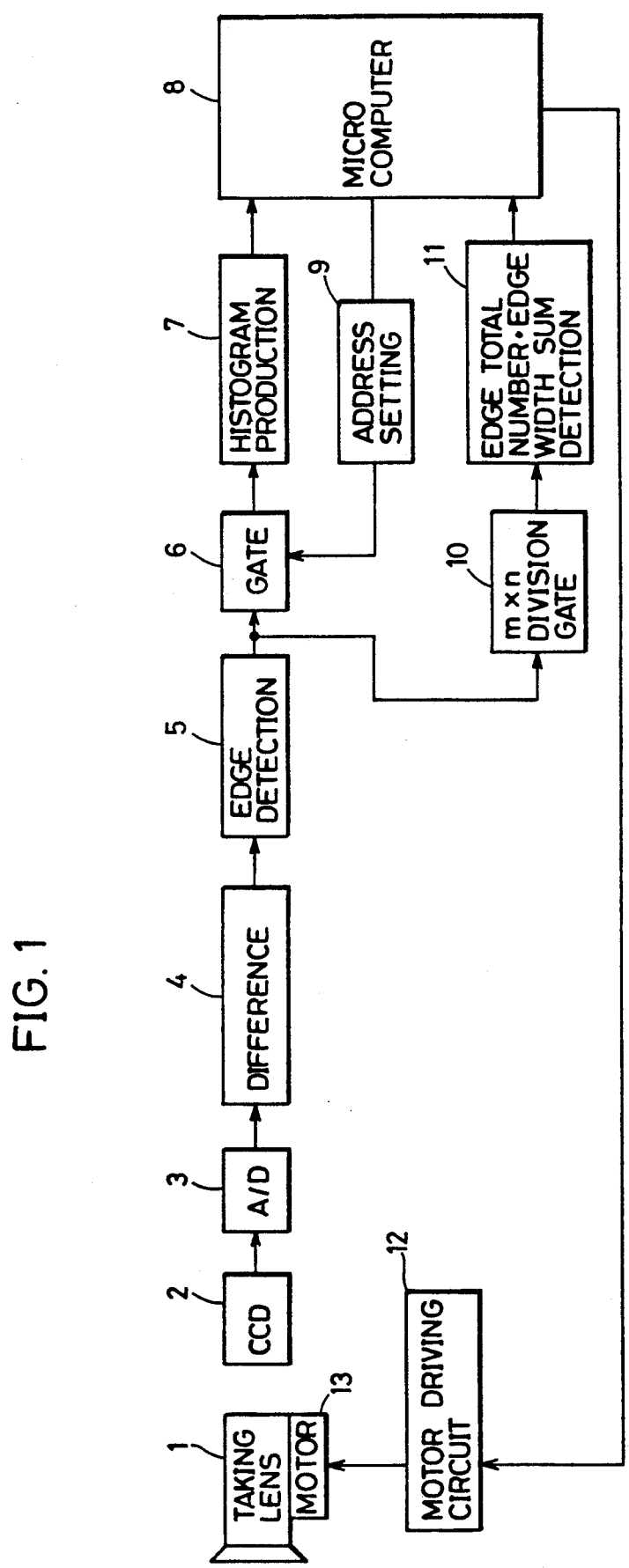
FIG. 1 is a diagram schematically showing a structure of an in-focus detection apparatus in accordance with the present invention.

Referring to FIG. 1, an in-focus detection apparatus in accordance with the present invention includes an image sensing lens 1, image sensing means (hereinafter referred to as CCD) 2 for forming the image of light reflected from an object through image sensing lens 1. CCD 2 converts an optical image into an electrical signal. The obtained electric signal which is an analog signal is converted into a digital signal at a subsequent A/D conversion circuit 3 and then further converted into a signal representing the signal level difference between pixels at a differential circuit 4, in other words converted into a differential signal. The resultant signal is transferred to an edge detection circuit 5, the number of pixels from a zero cross point to the next zero cross point of the differential signal is counted, and the edge width is detected. With the output of edge detection circuit 5 being provided on the entire picture plane, only an in-focus detection area (herein after referred to as AF area) portion is extracted by a gate processing circuit 6, and a histogram is produced by counting the number of edges for every edge width at a histogram producing circuit 7. The result is taken up by a microcomputer 8, and focusing operation is conducted after a prescribed calculation which will be described later.

An AF area is controlled by microcomputer 8 to be described later and an address setting circuit 9, and its size, position and shape are determined at gate processing circuit 6. Microcomputer 8 and address setting circuit 9 control the AF area, using object position information in the image sensing plane obtained from an m x n division gate processing circuit 10, an edge total number·edge width sum detection circuit 11, focal length information (not shown), aperture information, focus lens position information, etc. Control of the AF area will be described later.

The operation of the structure shown in FIG. 1 will be described in conjunction with FIGS. 1–3. First, a description will be provided on a usual AF operation in a not so out of focus state.

A luminance signal (Y signal in FIG. 2) produced by electrical conversion of light reflected from an object which passed through image sensing lens 1 in FIG. 1 and formed on CCD 2 is converted into a digital signal of, for example, 8 bits by A/D conversion circuit 3 and input into differential circuit 4. The digital signal is divided into two, one of which is input into a substraction circuit 14 and the other is input into N stages delay circuits 13a–13n and then input into substraction circuit 14 as well. Microcomputer 8 controls which signal among those from N stages delay circuits 13a–13n is used.

In the control, the presence and absence of effective data is inspected in each case by sequentially increasing the differential pitch beginning with the smallest one.

For example, one stage delay circuit 13a (differential pitch 1) is selected in the beginning. If differential data cannot be obtained by this selection or obtained data is sufficiently larger than the differential pitch presently selected by the representative value of the data (for example, histogram average value y which will be described later), one stage larger delay stage is selected next and the differential pitch is expanded.

By thus selecting the differential pitch, the adverse effects of noises can be removed if, for example, an object is of low frequency or low contrast, and effective differential data (see differential values in FIG. 3) can be obtained. Conversely, in the case of a high frequency object, differential data exclusive of the folded distortion of high frequency component can be obtained. Furthermore, with the high frequency component increasing at the time of focusing and low frequency component increasing otherwise, such a control can be made that the number of stages in delay circuits 13a-13n is increased at the time other than focusing and the number of stages in delay circuits 13a-13n is reduced as an in focus state approaches. A differential signal is produced at substraction circuit 14. The produced differential signal is once again divided into two.

As to one of the divided differential signals, its absolute value is produced by an absolute value producing circuit 15. The other signal is either input into a zero cross detection circuit 18 or subjected to differentiation by a similar method as described above and the obtained second order differential signal is input into a zero cross detection circuit which in turn generates a pulse every time it detects a point where the signal attains the zero level (referring to the zero cross signal of FIG. 3, it determines the portion between the light and dark of an image signal every time the differential value becomes 0). The configuration shown in FIG. 2 corresponds to the latter (second order differential).

Figure 3:
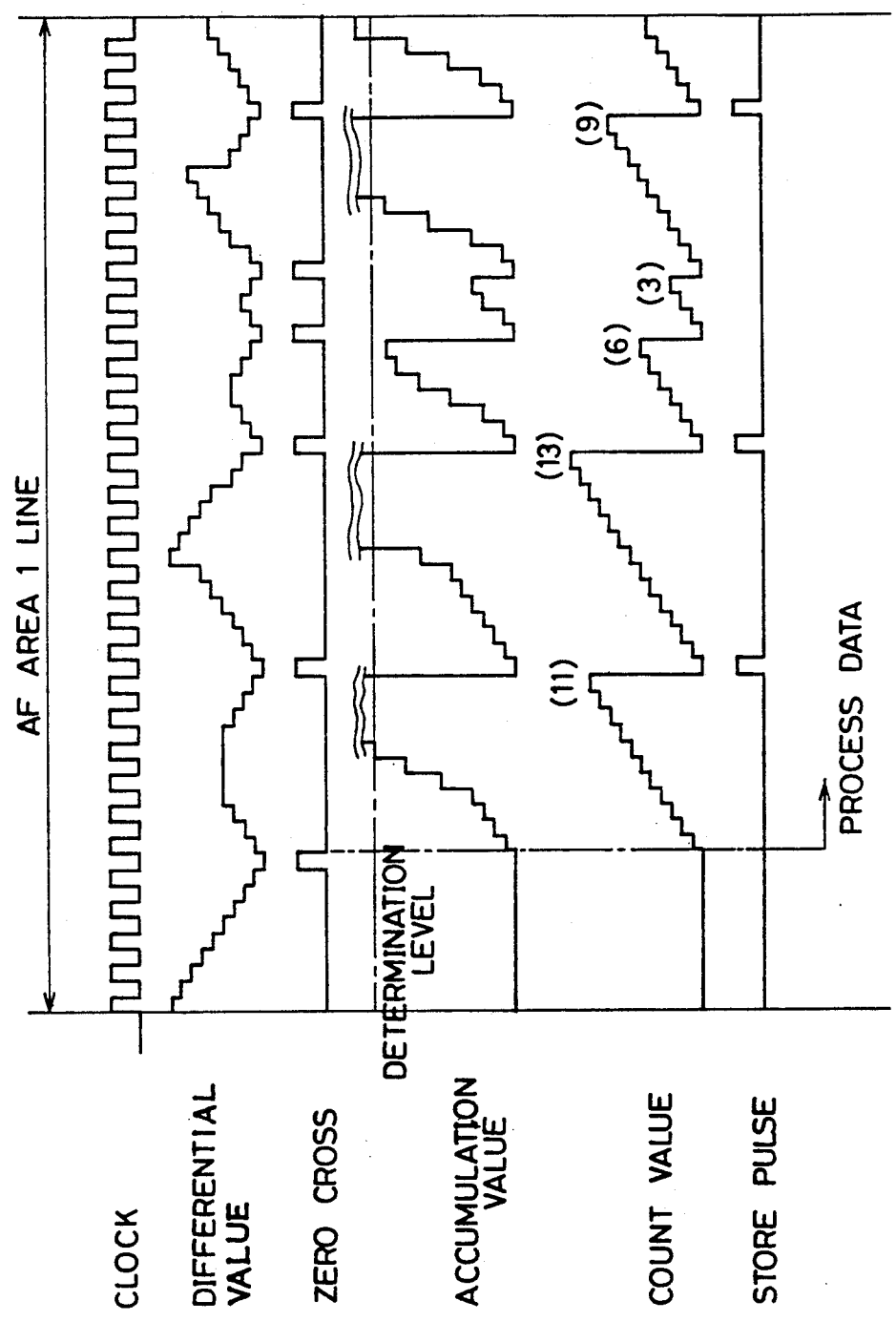
FIG. 3 is a representation schematically showing signals in the respective blocks shown in FIG. 2 at the time of usual AF operation.

An addition circuit 16 upon receiving the generated pulse adds the signals from the above-stated zero cross point to the next zero cross point among the data of the absolute value (referring to the integral value of FIG. 3, the signal portions represented by the differential values are added). The added result is input into a determination circuit 17 at the next stage, and compared to a prescribed luminance difference level (=k) set by microcomputer 8 for removing disturbance noises. If below the prescribed level, the added value is invalidated and not used for subsequent AF operations. Only the value above the prescribed level is used as effective data.

The value k does not always have to be a constant value. For example, k is set to be a larger value if ACG is large based on the ACG level of the image sensing camera portion. As a result, the ACG level increases at the time of low illuminance, and only an object edge can be detected even with increased noise.

Time from zero to zero of the differential values in other words the widths of the object edges are counted by edge width count circuit 19 which counts the number of clocks between pulses generated from zero cross detection circuit 18 (see the count values of FIG. 3). The count value is decoded by a count value decode circuit 20 when the counted result is determined to be effective data by the determination circuit.

Then the decoded value is divided into two, and one is input into a histogram counter 7 via a gate processing circuit 6 for controlling the AF area. The other is input into edge total number·edge width sum detection circuit 11 via m×n division gate processing circuit 10.

Figure 4:
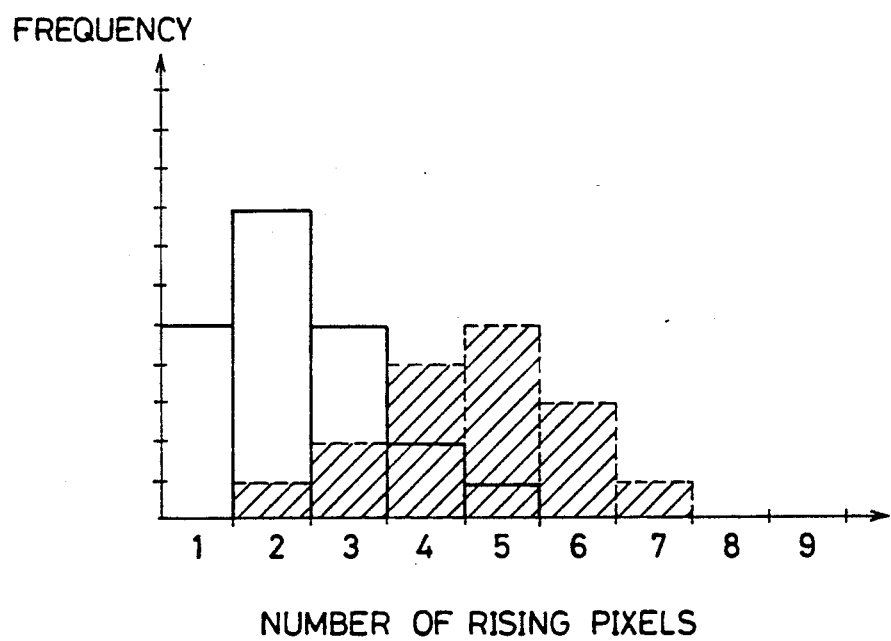
FIG. 4 is a graphic representation showing an example of histogram.

Histogram counter 7 stores the rising time (edge width) of the object entirely in the AF area and the number of edges. The stored values are transferred to microcomputer 8 during the vertical retrace line period of a video signal, and made into the histogram distribution in microcomputer 8 with the edge rising time on the abscissa and the frequencies on the ordinate as shown in FIG. 4.

The shadowed portions in the figure represent non-focus states and the empty boxes represent approximately in-focus states. The histogram mean value y is represented as:

$$y = \sum_{i=1}^{n} (\Delta ti \times Ni) / \sum_{i=1}^{n} Ni, \quad (1)$$

where the rising time is $\Delta ti$ ($i=1, 2, \ldots, n$), and the frequency is $Ni$ ($i=1, 2, \ldots, n$).

Although the nearer to 1 y gets, the higher the in-focus degree gets, the edges of an object actually area from a clear one to a blurry one, and the in-focus point does not necessarily correspond to 1. Therefore, y determined as the in-focus point changes depending upon the MTF of an image sensing lens, the frequency characteristic of video circuitry, image sensing conditions and so on, and a number not more than about 3-5 (the half when a second order differential signal is used) can be considered as the in-focus point in the case of NTSC 4fSC sampling.

When the forward movement of a focus lens is x, y changes linearly relative to x as shown in FIG. 5. This is for exactly the same reason why the projected image of a point light source on a CCD in other words the diameter of the circle of confusion changes linearly relative to the amount of movement of a focus lens.

The relation between y and x is represented as:

$$y = a + bx,$$

and the forward movement of the focus lens $x_0$ at the in-focus point where y at the time of focusing is $y_0$ can be represented by the following equation:

$$x_0 = (y_0 - a)/b$$

Therefore, moving the focus lens in accordance with the value provides the in-focus condition.

The values of a and b can be produced from, for example, x ($x_1, x_2, \ldots x_n$) and y ($y_1, y_2, \ldots y_n$) obtained for the past n times in accordance with the following equation:

$$b = \frac{\sum_{i=1}^{n} xiyi - \left(\sum_{i=1}^{n} xi \cdot \sum_{i=1}^{n} yi\right)/n}{\sum_{i=1}^{n} xi^2 - \left(\sum_{i=1}^{n} xi\right)^2/n} \quad (2)$$

$$a = \frac{\sum_{i=1}^{n} yi}{n} - b \frac{\sum_{i=1}^{n} xi}{n} \quad (2)$$

It is however necessary to determine the initial driving direction based on whether y increases or decreases when the focus lens is slightly driven.

In m × n division processing gate processing circuit 10 and edge total number-edge width sum detection circuit 11, edge information for every divided small area in the image sensing plane in other words object position information in the image sensing plane is produced and output to microcomputer 8. Microcomputer 8 in turn conducts a AF area determination operation based on the given information, focal distance information which is not shown, aperture information, focus lens position information, etc. Based on the calculation results, microcomputer 8 outputs AF area data to address setting circuit 9.

Figure 8:
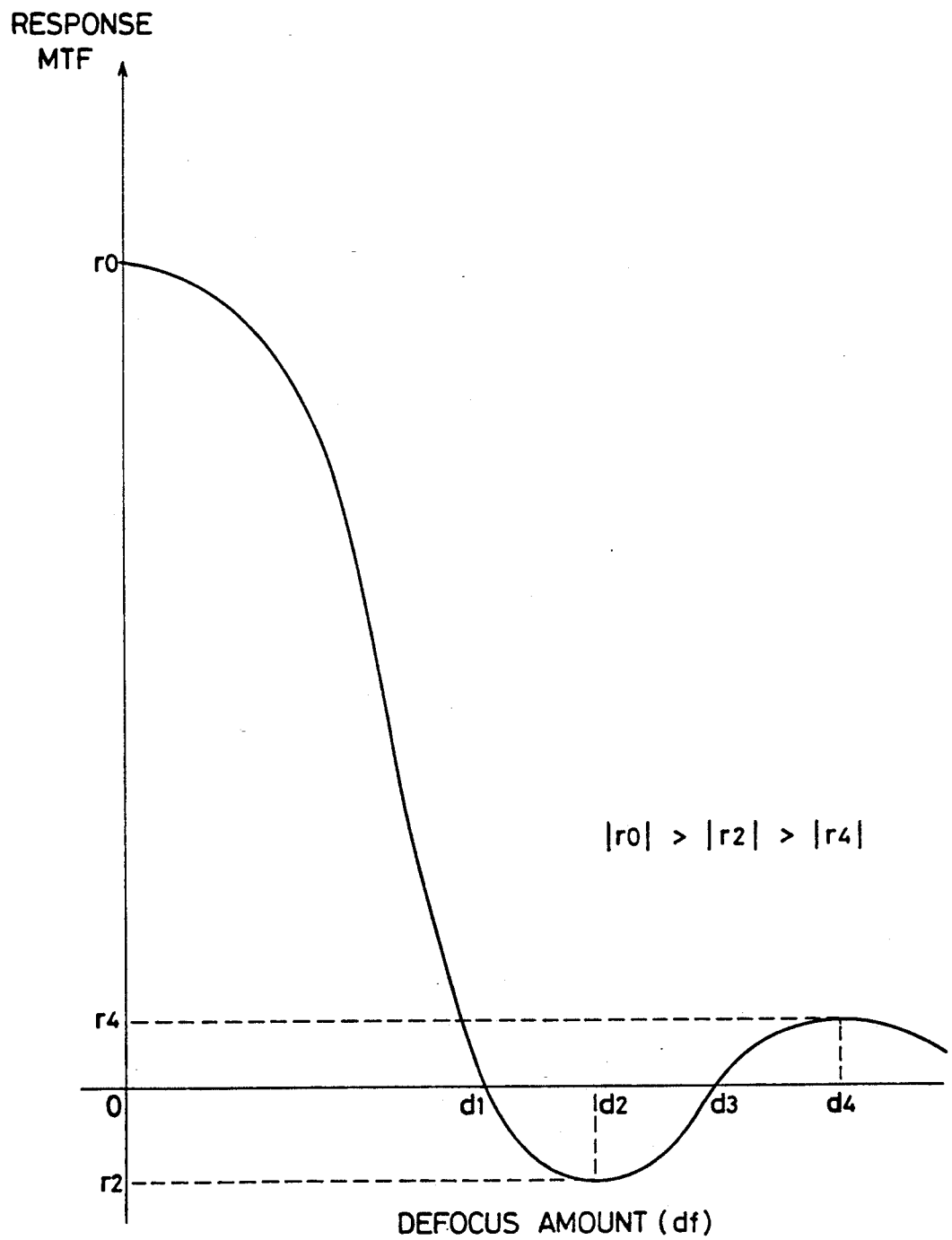
FIG. 8 is a representation showing change of the response of a lens relative to a frequency component in accordance with the degree of in-focus condition (defocus amount)

Now a description will be provided on a largely out of focus state in conjunction with FIGS. 6-8.

In the largely out of focus state, interference takes place between adjacent edges, and, therefore, it is not possible to detect an accurate focus point in accordance with the above-described method by which in-focus determination is made using edge widths. A further detail, description will be provided in conjunction with FIGS. 6(a)-6(e).

The left side of FIGS. 6(a)-6(e) represents an actual object image and the right side represents change in the amount of light received by a CCD relative to the object image shown in the left side. When a pattern of white and black being periodically and regularly repeated is sensed, by changing the state from in-focus to out-of-focus moving the focus lens, the luminance difference from peak to peak in the object image monotonously decreases, while the edge width monotonously increases (see FIG. 6(a)→(b)). When an expanding edge based on defocus becomes large enough to interfere with the expansion of an adjacent edge, the increase of the edge width stops and only reduction in the luminance difference from peak to peak continues leading to 0 (FIG. 6(b)→(c)).

With the defocus amount being further increased, the pattern of the object image has its light and dark reversed from the original image, with its edge width unchanged, while the luminance difference increases. The pattern of the object image reaches its maximum at a point (FIG. 6(d)→(e)), but the luminance difference is smaller than that at the in-focus point.

Figure 6C:
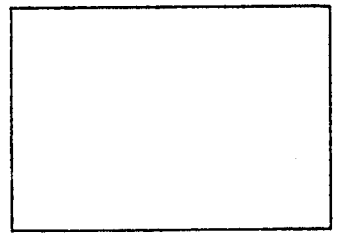

If the defocus amount is larger than FIG. 6(b), the detected edge width Δt1 does not change even when the focus lens is driven. It is necessary at that time to evaluate the luminance difference (contrast) of the edge portions. A prescribed value k' used for evaluating contrast is shown in FIGS. 6(a)-6(e) by way of illustration. The above-described histogram is produced using the width Δt' from the edge rising point to the point where the signal level difference reaches k'. A representative value in the histogram (for example, the mean value or barycentric value) is used for the contrast evaluating value.

The direction in which the representative value of the histogram decreases is the direction in which the contrast increases, and, therefore, focusing is initiated in this direction. AF operation at that time is conducted exclusively for the direction of out of focus state. More specifically, unlike usual AF operation, determination circuit 17 in FIG. 2 not only controls count value decode circuit 20, but also outputs a count inhibition signal to edge width count circuit 19 during the period in which an output from addition circuit 16 surpasses a prescribed level (the period in which the item of accumulated values in FIG. 7 surpasses determination level) and stops counting the edge widths during this period (see the item of count values in FIG. 7).

The prescribed level may be set to be equal to the above-stated k. As for an edge with a luminance difference sufficiently larger than k, the contrast can be evaluated accurately by setting k' to be an even larger value.

However, in using the contrast for evaluation of in-focus detection, a problem associated with pseudo peak as described above is encountered. A detailed description will be provided on this pseudo peak in conjunction with FIG. 8.

When the focus lens is changed from the in-focus state to out-of-focus state, the contrast of an object (which is herein a response to a certain frequency component of the lens) changes as shown in FIG. 8.

More specifically, referring to FIG. 8, the response monotonously decreases relative to the increase of defocus amount df during the period in which df satisfies $0 < df < d1$, and the value is positive (corresponding to FIGS. 6(a)-(b)), while the response becomes 0 when $df = d1$ holds (FIG. 6(c)), and the response becomes negative when $d1 < df < d3$, and takes the maximum value when $df = d2$ (FIGS. 6(d)-(e)). This indicates that when an object containing much of the frequency component is sensed, the contrast of an object image becomes maximum even in the out-of-focus state if $df = d2$ holds.

However, as for the maximum value of response in the out-of-focus state ($r_2$ and $r_4$ in FIG. 8), its absolute value is smaller than the response at the in-focus point and decreases as a function of distance from the in-focus point (in FIG. 8, $|r_0| > |r_2| > |r_4|$).

According to the present invention, in order to set the contrast to be the evaluation value of in-focus detection at a largely out of focus state, pseudo peak mode is employed with respect to the pseudo peak as stated above, which will be described later.

Another example for contrast evaluation is to provide a contrast multiplication unit. According to this method, the unit is separately provided from the element shown in FIGS. 1 and 2, which inputs the respective outputs from addition means 16, determination circuit 17, and zero cross detection circuit 18 in FIG. 2, and multiplicates the luminance differences between edges and outputs the result to microcomputer 8. According to this method, AF operation is conducted, employing the direction in which the output obtained by the unit (contrast multiplication value) increases as the in-focus direction.

Figure 9:
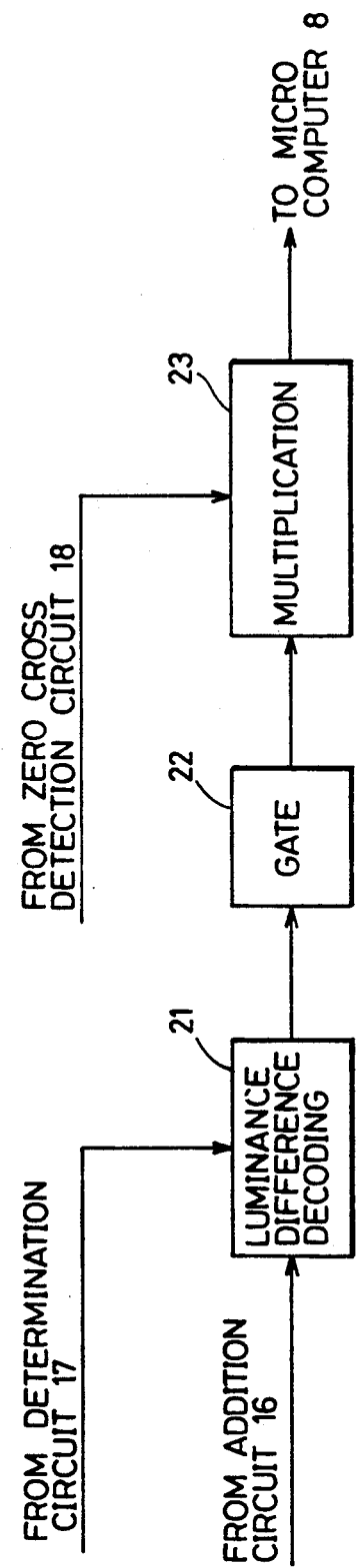
FIG. 9 is a block diagram showing another example of contrast evaluation.

FIG. 9 is a diagram illustrating the circuit configuration of the contrast multiplication unit. The luminance difference between edges (accumulated value in FIG. 3) from addition circuit 16 in FIG. 2 and a determination result from determination circuit 17 are input into a luminance difference decode circuit 21, and the luminance difference is decoded if the determination result is determined to be effective data. The decoded value is input to a multiplication circuit 23 via a gate processing circuit 22. Gate processing circuit 22 is identical to gate processing circuit 6 in FIG. 2.

Figure 2:
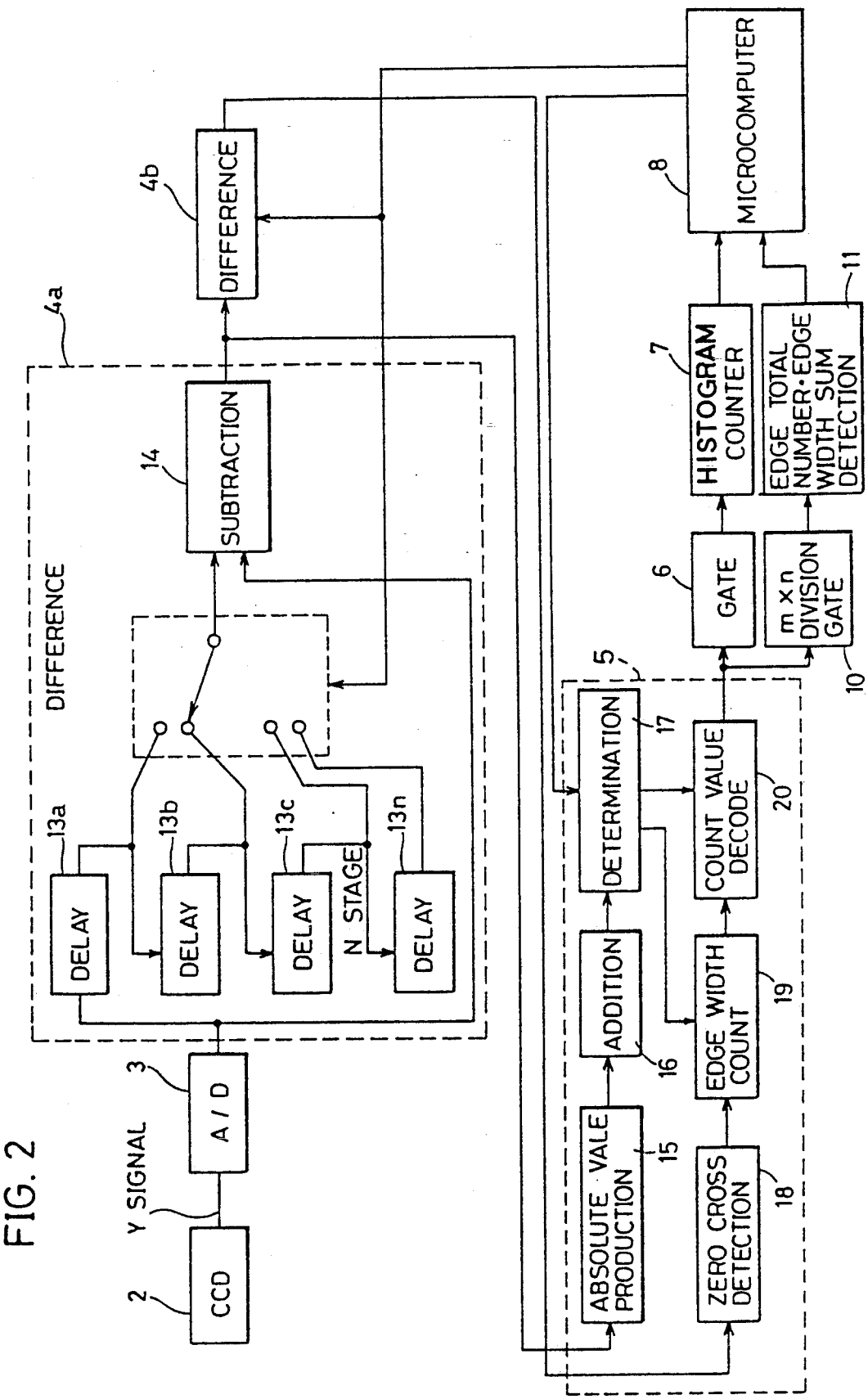
FIG. 2 is a circuit diagram showing the essence of an in-focus detection apparatus in accordance with the present invention.

Multiplication circuit 23 inputs a pulse output from zero cross detection circuit in FIG. 2 and multiplies the luminance difference obtained through gate processing circuit 22 over the entire region in the AF area every time it receives the pulse. When the multiplication is complete or in the vertical retrace line period of a video signal, the multiplication result is transferred to microcomputer 8 in FIG. 2.

Figure 10:
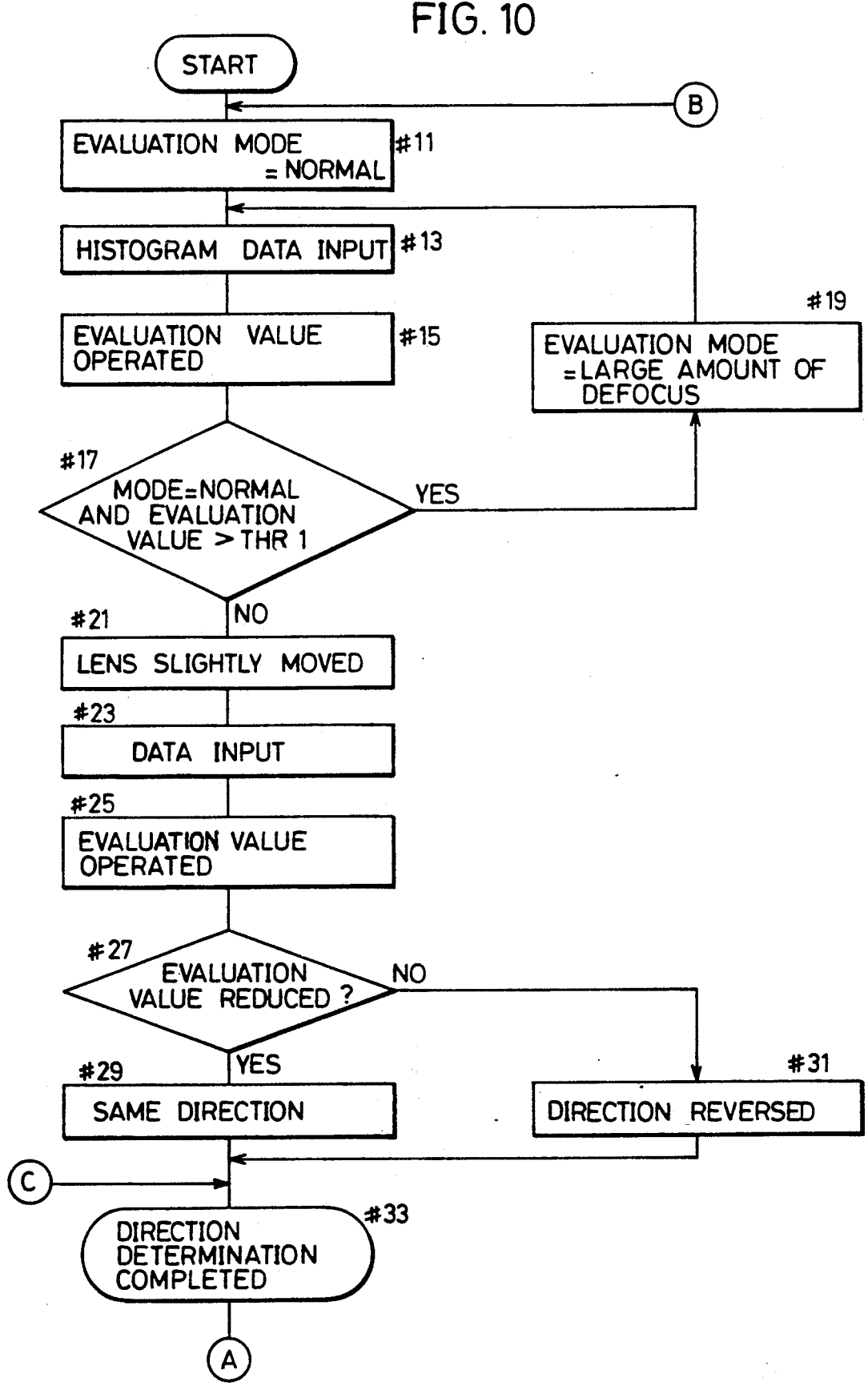
FIG. 10 is a flow chart showing a sequence from an out-of-focus condition to the in-focus condition.
Figure 11:
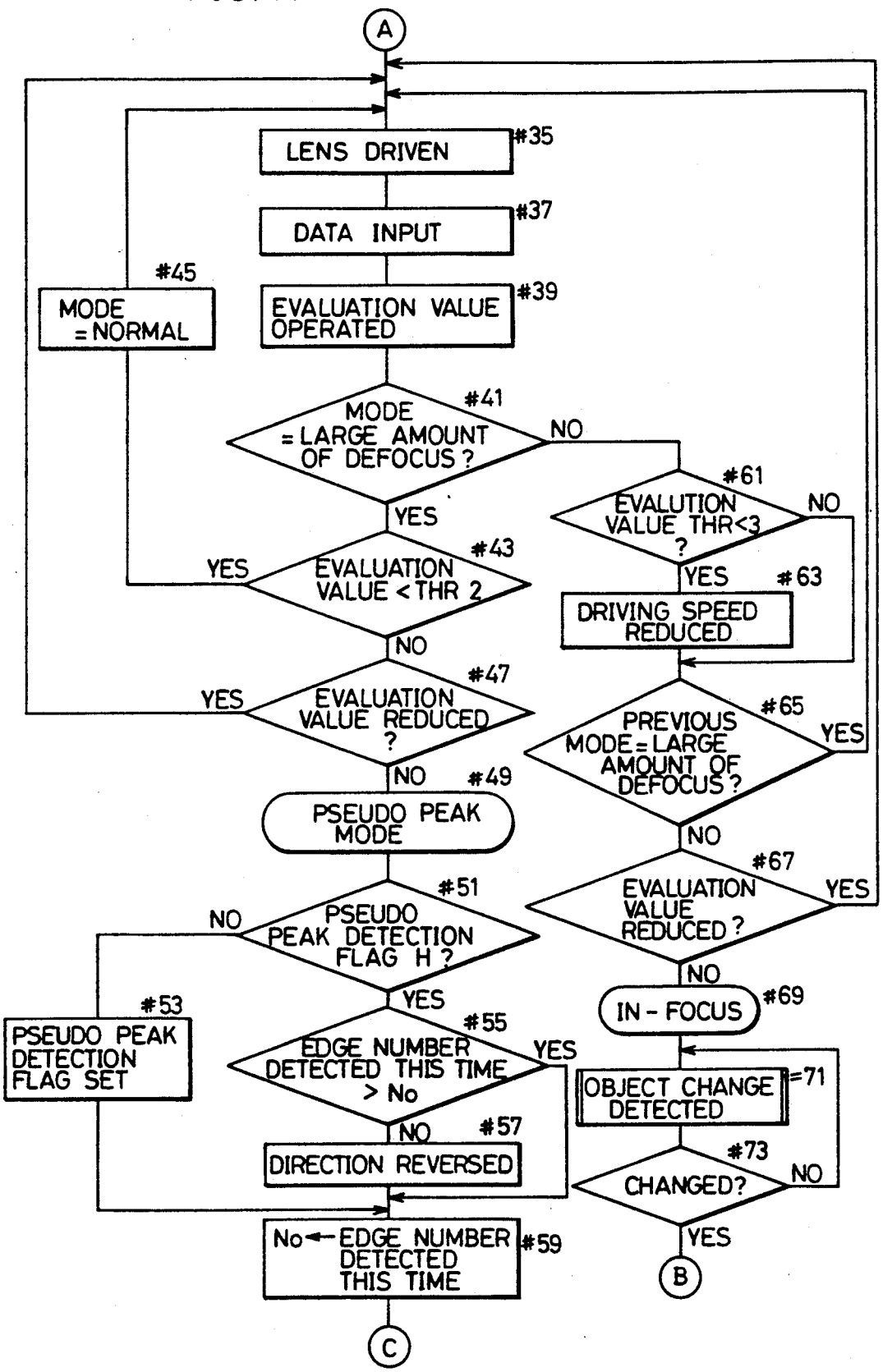
FIG. 11 is a flow chart showing a sequence from an out-of-focus condition to the in-focus condition.

Referring to FIGS. 10 and 11, a sequence from the out-of-focus condition to in-focus condition in an in-focus detection apparatus in accordance with the present invention will be described. First evaluation mode is set to usual AF mode (#11), and histogram data is input to conduct a calculation for producing an evaluation value to evaluate in-focus degree from the histogram (hereinafter abbreviated as evaluation value calculation) (#13, #15). The barycentric value or mean value of the histogram is used for the evaluation value. The evaluation value calculation will be described later.

When the operation of #15 is usually conducted in AF mode and obtained evaluation value is larger than a first threshold value, the evaluation mode is turned to largely out of focus mode, and data input and evaluation value calculation are once again conducted (#19, #13, #15 when YES in #17). With the evaluation value calculation is in largely out of focus mode or usual mode, if the evaluation value is below the first threshold value (NO in #17), the focus lens is slightly moved for detecting the direction of out of focus state (#21).

After slightly moving the lens, the histogram data is once again input to conduct evaluation value calculation (#23, #25), and the direction in which the above-stated evaluation value decreases is the in-focus direction (#27-#31). Histogram data input and evaluation calculation are conducted after the focus lens is driven by a prescribed amount in the direction thus detected (#33 -#39).

If the evaluation mode is the largely out of focus mode, the flow returns to serial driving in #35 switching to usual AF mode if the evaluation value is below a second threshold value (#45, #35 when YES in #41 and #43). If the evaluation value is above the second threshold value and yet does not decrease, the flow proceeds to the pseudo peak mode which will be described later (#49, when NO in #43 and #47).

If the evaluation mode at the time of the evaluation value calculation in #39 is the normal mode, the evaluation value is compared to a third threshold value. If the evaluation value is below the third threshold value, it is inspected whether or not the previous evaluation mode is the largely out of focus mode after decreasing the driving speed of the lens (when NO in #41, #61-#65). If the previous evaluation mode is the largely out of focus mode, the evaluation values cannot be compared between previous and present times, and the flow once again returns to lens driving shown in #35 (#35 when YES in #65). If the previous evaluation mode is the normal mode, comparison is made between the previous evaluation mode and the present variation mode (#67).

If the evaluation value has decreased as the result, the program returns to #35, and continues to drive the lens (#35, when YES in #65 and #67), while if the evaluation value does not decrease, based on the determination that the lens reached the in-focus point, the flow proceeds to a prescribed object change detection operation (#69, #71 when NO in #67). In the object change detection operation in #71, the same evaluation value calculation as #39 is conducted for every prescribed period. If the obtained evaluation value changes to some extent, it is determined that the object changes. As the result of the above-stated determination operation, if it is determined that the object is not changed, the determination operation is repeated. However, if it is determined that the object has changed, AF operation is conducted from the beginning (when YES in #71 and #11 #73).

If the evaluation value is larger than the second prescribed value based on the determinations in #43 and #47 and yet does not decrease any more, the value is determined to have reached the pseudo peak. It is checked whether or not the pseudo peak has been already detected in the present focusing operation (#51).

If the pseudo peak has not yet been detected, a pseudo peak detection flag is set. After the number of edges detected this time is stored as the pseudo peak detection edge number $N_0$ of the previous time, further driving continues in the same direction in order to search the true in-focus point (#53, #59, #33, #35). If the pseudo peak has been already detected, the edge number detected this time and the previous pseudo peak detection number $N_0$ are compared. If the edge number detected this time is larger, the driving direction is set to be the same direction as until this time and if otherwise in the opposite direction. Then, the edge number detected this time is stored as the previous time pseudo peak detection edge number $N_0$ and driving continues (#55-#59, #33, #35).

In the pseudo peak mode, as shown in FIG. 8, $|r_0| > |r_2| > |r_4|$ holds, and, therefore, the nearer to the in-focus point the pseudo peak is, the larger its contrast gets (the number of edges detected increases). Serial driving of the lens is therefore conducted in the pseudo peak mode taking advantage of the property.

The procedure of evaluating contrast with the use of the contrast multiplication unit is as follows.

In FIGS. 10 and 11, only if the evaluation mode is the largely out of focus mode, histogram data input and a part of the evaluation value calculation (#13-#15, #23-#25, #37-#39) are replaced with a multiplication result input from the contrast multiplication unit, and the direction of comparison between the evaluation values in the same mode is reversed (YES and NO in #27 and #47 are reversed). A specific procedure is not shown by way of illustration.

The reason for conducting the above-stated procedure is that in the case of contrast evaluation by the above-stated $\Delta t$, the direction in which $\Delta t'$ decreases is the direction in which the contrast increases, while the direction in which the multiplication result increases is exactly the direction in which the contrast increases in the case of the contrast multiplication unit is used.

Also in the pseudo peak mode in FIG. 11, when contrast evaluation is made using the contrast multiplication unit, the contrast multiplication result of this time is used in #55 and #59 instead of the number of edges detected this time, and the in-focus direction is detected by comparing the contrast multiplication results between this time and previous time pseudo peak detections instead of the number of edges.

This allows more accurate detection of direction as compared to the case in which the edge numbers are compared. As for the number of edges and the contrast multiplication result, the direction of contrast increase coincides with that of defocus amount increase, a determination in #55 (YES/NO) is unchanged even when the contrast multiplication result is used.

Figure 12:
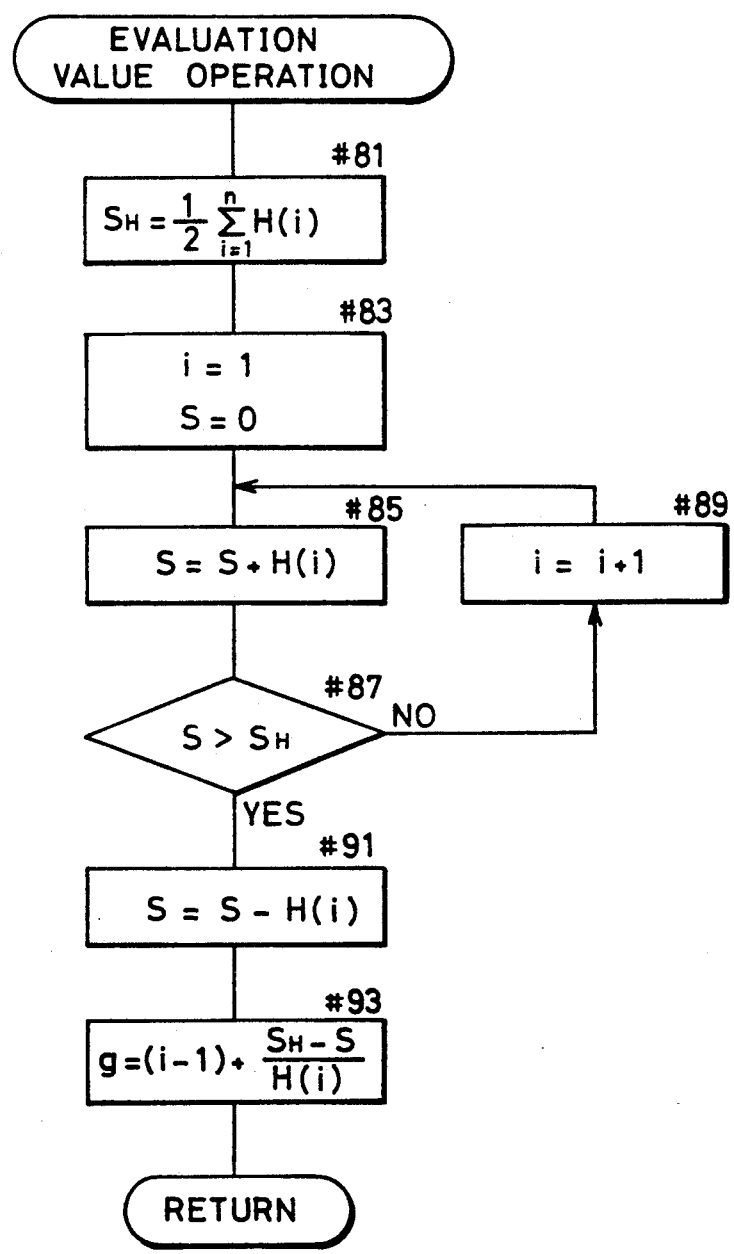
FIG. 12 is a flow chart showing a sequence when the barycentric value of a histogram is produced.

A sequence of producing the barycentric value of a histogram is shown in FIG. 12 as an example of the above-stated evaluation value calculation. In FIG. 12, H (i) (i = 1, 2, ... n) represents the frequency of the edge width of the i-th pixel, and is the same as the frequency of each rising pixel in FIG. 4. In FIG. 12, the half of the sum of the frequencies $S_H$ is produced in #81, the frequencies are added up sequentially beginning from the frequency of the minimum edge width in #83-#89, and at which edge width i the result S surpasses $S_H$ is determined. The edge widths before and after surpassing $S_H$ in #91 and #93 in other words (i−1) and i are linearly interpolated and the edge width g (the barycentric value of histogram) corresponding to $S_H$ is produced.

A description will be provided on a method of setting an AF area. In FIG. 2, edge information for every divided small area in an image sensing plane, in other words object position information in the image sensing plane is produced in m×n division gate processing circuit 10 and edge total number·edge width sum detection circuit 11, and output to microcomputer 8. Microcomputer 8 based on the given information, focal distance information which is not shown, aperture information, focus lens position information, etc. conducts AF area determination calculation. Microcomputer 8 based on the calculation result outputs the AF area data to address setting circuit 9 (see FIG. 1).

Figure 13:
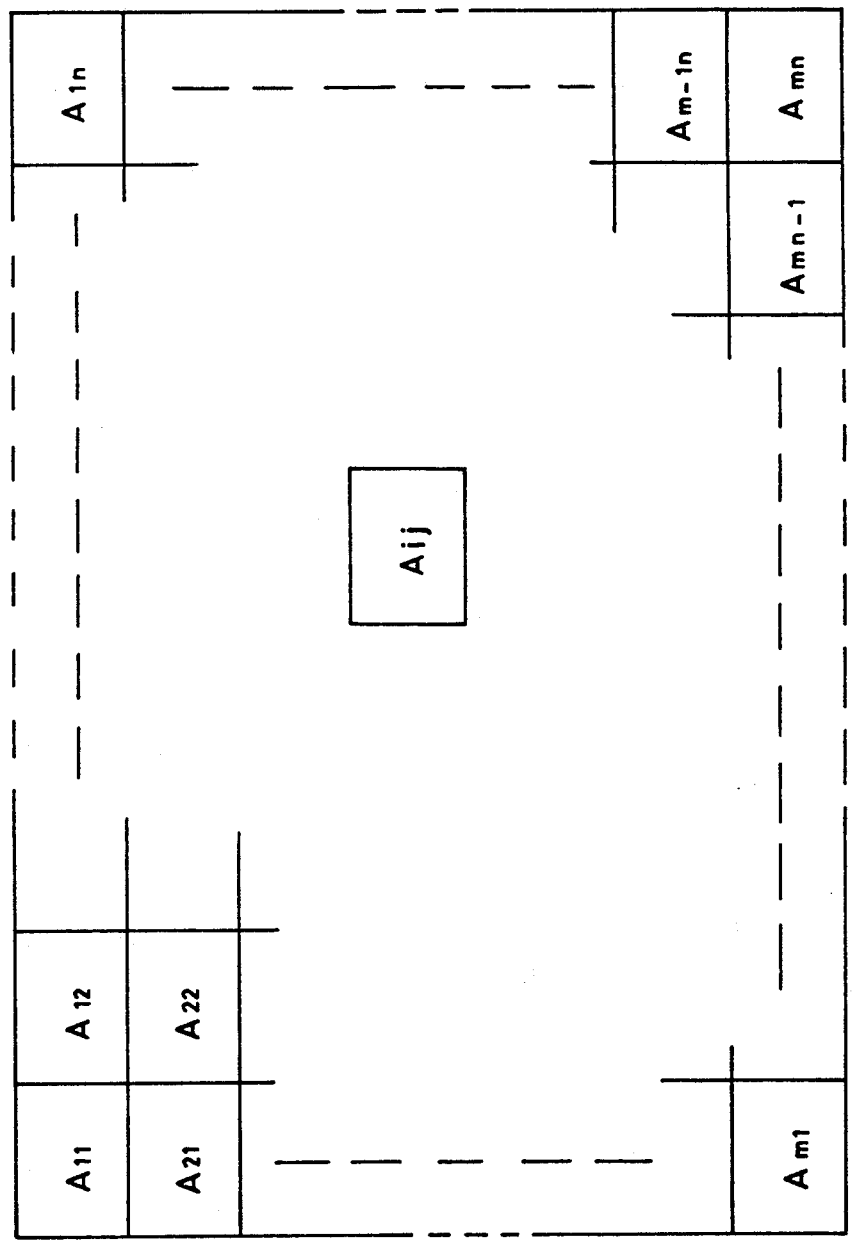
FIG. 13 is a representation showing divided small areas.

Referring to FIG. 13, $A_{ij}$ (i=1−m, j=1−n) is one of small areas produced by dividing the entire area of the image sensing plane by m×n, and the small area in the i-th row and j-th column. The edge total number $N_{ij}$ and edge width sum $WS_{ij}$ in $A_{ij}$ are calculated for each of the small areas where i=1−m, and j=1−n in the above-stated edge total number edge width sum detection circuit 11 and output to microcomputer 8.

Figure 14:
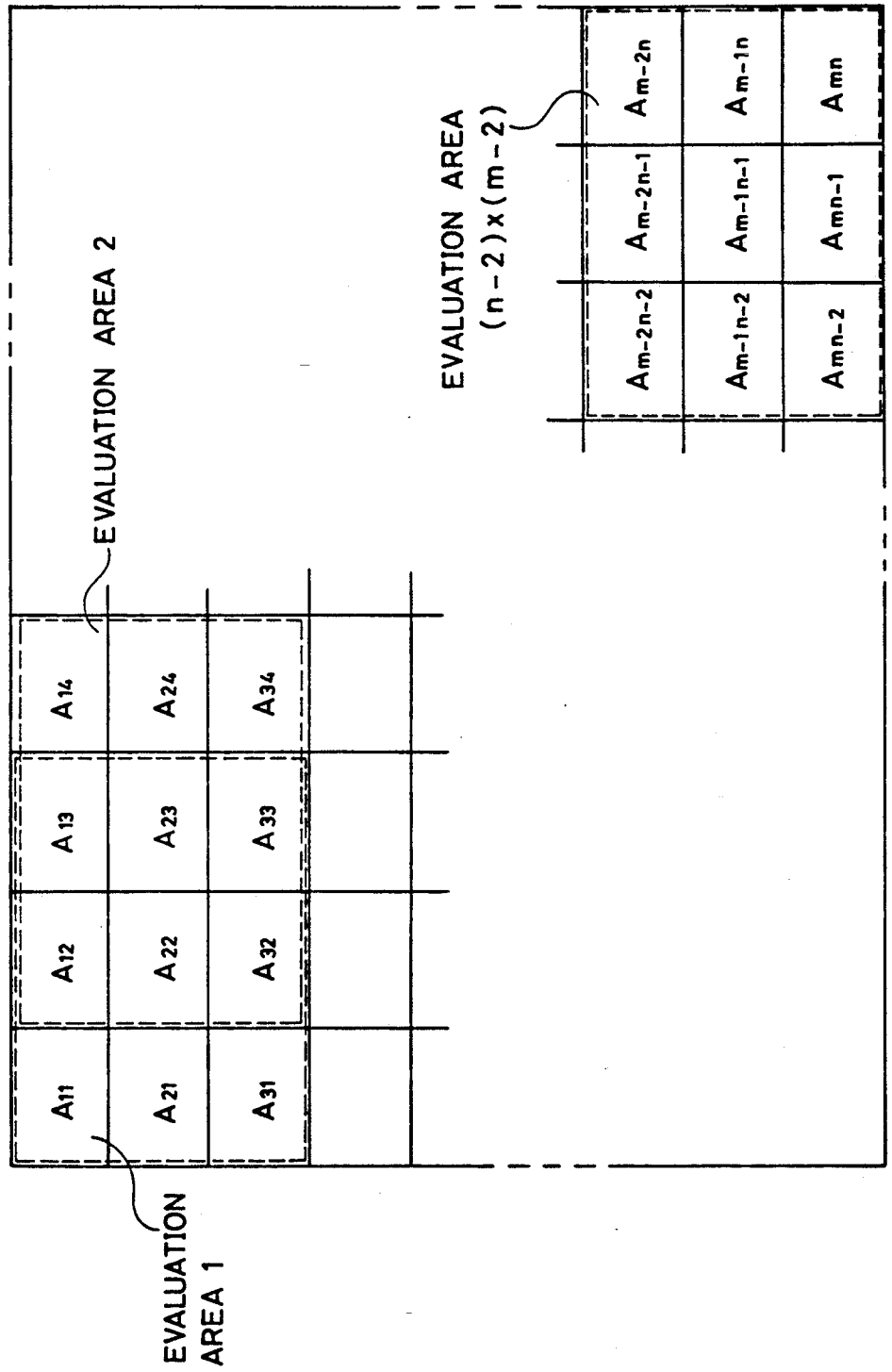
FIG. 14 is a representation for illustrating an AF area determination calculation.

FIG. 14 is a diagram illustrating AF area determination calculation conducted in microcomputer 8. When $N_{ij}$ and $WS_{ij}$ for every small area are input into microcomputer 8, microcomputer 8 sets in the upper left part of the small area region an evaluation area having the same size as the presently set AF area (evaluation area 1). The size of the AF area will be described later.

Then microcomputer 8 calculates a mean edge width $y_{ij}$ produced by $y_{ij}=WS_{ij}\div N_{ij}$ for every small area $A_{ij}$ in the evaluation area, and then produces an evaluation value for setting area $E_l$ in accordance with the following equation.

$$E_1 = \sum_i \sum_j N_{ij} \times W_{yij} \times W_{ij}, \quad (3)$$

where $W_{yij}$ is a weighting coefficient based on the mean edge width $y_{ij}$ and $W_{ij}$ is a weighting coefficient based on the position of the small area $A_{ij}$ in the image sensing plane.

Examples of $W_{yij}$ and $W_{ij}$ are shown in FIGS. 15 and 16. As can be seen from FIG. 15, the smaller the mean edge width $y_{ij}$ is, in other words the higher the focusing degree is, the larger will be the coefficient $W_{yij}$ (A) in FIG. 16 shows coefficients at the time of center weighted AF, and the coefficient $W_{ij}$ increases as approaching the center. FIG. 16(B) shows coefficients in the case of present AF area position center weighted AF and the nearer to the AF area set at present in the figure, the larger gets the coefficient $W_{ij}$.

When the foregoing operation is complete as to the evaluation area 1, microcomputer 8 shifts the position of the evaluation area to the right by one small area (FIG. 14, evaluation area 2). The same operation is conducted as to evaluation area 2, and an evaluation value for setting area $E_2$ is produced.

When a calculation as for a certain evaluation area is complete as described above, shifting further right to by one small area, the evaluation value for setting area E is produced for a new evaluation area (however if the evaluation area reaches the far right end of small areas, the position is shifted to the left end and one small area below).

The above-described calculation is repeated until the evaluation area reaches the lower right end and all evaluation values E for setting area are produced. Microcomputer 8 selects the one with the maximum evaluation value E among all the evaluation areas, and outputs data having this area as the position of the next AF area to address setting circuit 9.

Figure 17:
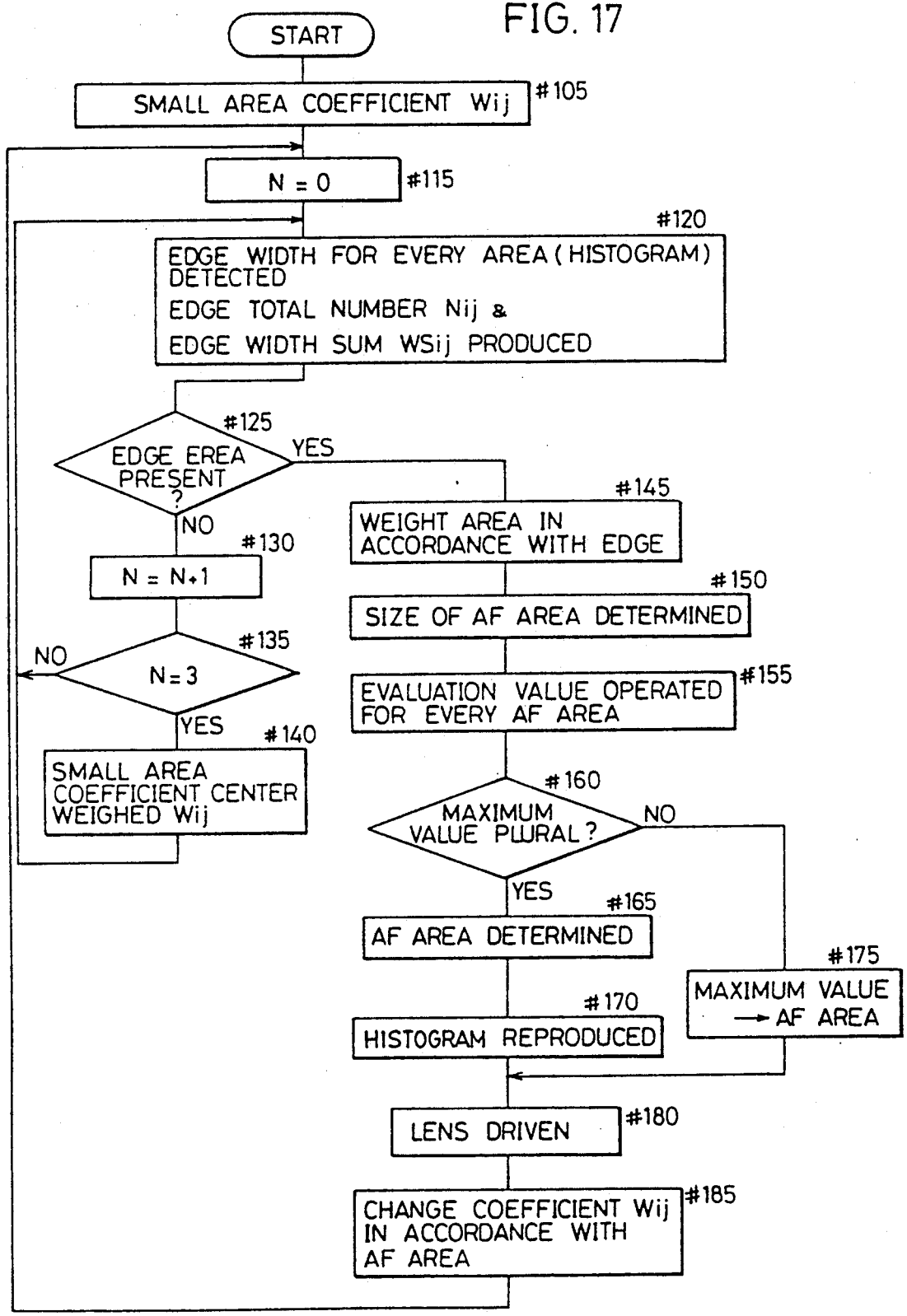
FIG. 17 is a flow chart for illustrating a method of setting an AF area.
Figure 19B:
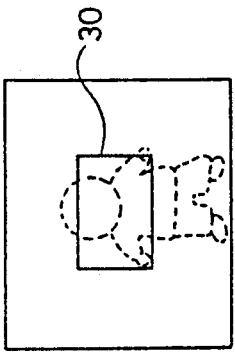
FIGS. 19(A) and 19(B) are representations for illustrating that the difference exists in object edge widths between in-focus state and out-of-focus state.
Figure 19D:
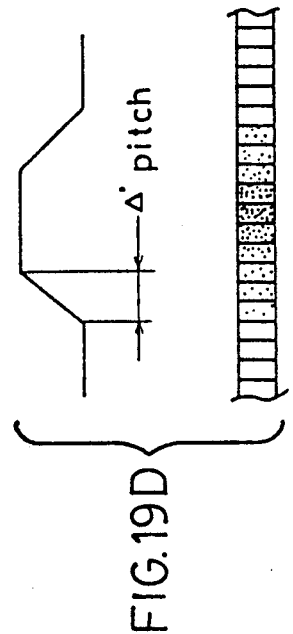
Figure 19A:
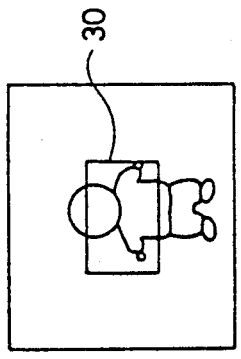
Figure 19C:
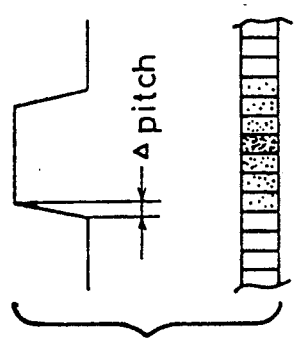

An example of method of setting the AF area as described above will be further explained along an AF sequence in conjunction with FIG. 17.

When AF operation starts, a weighting coefficient in accordance with center weighted AF method of FIG. 16(A) is provided to every small area (#105). Then by setting a variable N to be 0, an edge total number $N_{ij}$ and an edge width sum $WS_{ij}$ are calculated for every small area (#115-#120). Determination is made as to whether or not an area having an object edge exists and if no such area exists, the variable N is incremented by 1 and determination is made as to whether N=3 holds (#125-#135). If N=3 is not true, the sequence returns to #120, and if N=3 holds, a weighting coefficient for every small area is set to be the coefficient of center weighted AF and returns to #120 (#140).

If an area having an object edge is found in #125, a weighting coefficient $W_{yij}$ as shown in FIG. 15 is set in accordance with the mean edge width $y_{ij}$ of the detected edge (#145).

Then in #150, the size of AF area is determined. Based on an image sensing magnification ($\beta$=focal length/object distance) and an aperture value, the size of AF area is determined. The depth of focus generally decreases as a function of increase of image sensing magnification, and, therefore, it is desirable to reduce the AF area so that the focus point comes only on the main object.

The same is applied to the aperture value, the more open the aperture is, the smaller the focal depth, and the AF area is therefore kept small. FIG. 18 illustrates such a case. The numbers shown in FIG. 18 represent the numbers of small areas constituting the AF area when the whole area is divided into 9×9=81 small areas. In the above case, the size of AF area is determined based on the image sensing magnification and aperture value, but the user may previously manually set it.

After the determination of the size of AF area, the evaluation area is sequentially shifted from the upper left to the lower right as described above, an evaluation value for setting area is calculated for each in accordance with the following equation and its maximum value is produced (#155).

$$E = \sum_i \sum_j N_{ij} \times N_{ij} \times W_{yij} \times W_{ij} \quad (4)$$

Determination is made as to whether or not the maximum value exist in plurality in #160. If there is the maximum value in plurality, one of the following areas is set to be the AF area (#165).

(1) all of the plurality of evaluation areas
(2) the one closest to the center among the plurality of evaluation areas, and
(3) a square area surrounding the plurality of evaluation areas The selection among the above (1)-(3) is absolutely arbitrarily made.

After the determination of the AF area, the above-stated histogram is produced in the AF area, based on the histogram the lens is driven (#170, #180). If there exists only one maximum value, the evaluation area which produced the maximum value is set to be the AF area and based on the histogram in that area (calculated in #120), the lens is driven (#175, #180).

After the driving of the lens, the weighting coefficient $W_{ij}$ based on the position is reset to be the weighting coefficient in accordance with the present AF area position center weighted AF method shown in FIG. (16) and the next AF operation is initiated (#185).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An in-focus detection apparatus, comprising:
   image sensing means for converting an object image formed by a photographing optical system into an electrical image signal;
   edge width detection means for detecting a plurality of edge widths of the object in a prescribed area of an image sensing plane based on said image signal to provide edge width data;
   lens driving amount calculation means for calculating the driving amount of a focusing lens to the in-focus point based on the distribution state of said edge width data; and
   driving means for driving the focusing lens based on the output of said lens driving amount calculation means.

2. An in-focus detection apparatus as recited in claim 1, further comprising means for causing the image sensing means to form a plurality of electrical image signals and differential means for discretely sampling said image signals and outputting a differential signal representing the difference between the image signals, wherein
   a zero cross signal is output every time said difference becomes zero, and
   said edge width detection means detects an edge width by counting time from said zero cross signal to the next zero cross signal.

3. An in-focus detection apparatus as recited in claim 2, wherein
   said differential means changes the pitch of said sampling depending upon a focus condition.

4. An in-focus detection apparatus as recited in claim 1, further comprising frequency distribution producing means for producing a frequency distribution from the edge widths and frequencies based on the detected edge width data and outputting a representative value in the distribution as an evaluation value for in-focus determination,
   said lens driving amount calculation means for calculating the driving amount based on the representative value.

5. An in-focus detection apparatus as recited in claim 4, wherein
   said representative value is either the mean value, barycentric value or the total number of the edge width data 6. An in-focus detection apparatus as recited in claim 1, wherein
   said lens driving amount calculation means finds the relation between the lens driving amount and an edge width characteristic line based on the edge width data received over a plurality of times in the past and calculates an approximate in-focus point from a crossing point of this line and an edge width considered to be in in-focus, and
   said driving means drives the lens toward the approximate in-focus point.

7. An in-focus detection apparatus as recited in claim 1, wherein
   said image sensing means includes an automatic gain control function,
   said edge width detection means has a threshold value for removing noise from the image signal output from the image sensing means, and the threshold value changes in accordance with the gain level of said automatic gain control.

8. An in-focus detection apparatus, comprising:
   imaging sensing means for converting object images formed by a photographing optical system into electrical image signals;
   edge width detection means for detecting a plurality of edge widths of an object in a prescribed area of an image sensing plane based on the image signals to provide edge width data;
   contrast detection means for detecting a plurality of contrasts of said object in said prescribed area;
   a first frequency distribution producing means for producing a first frequency distribution from the edge widths and frequencies based on said detected edge width data;
   a second frequency distribution producing means for producing a second frequency distribution from the contrast values and frequencies based on said detected plurality of contrast data;
   focus detection means for detecting a focus point based on either said first or second frequency distribution; and
   selection means for selecting one of said first and second frequency distributions for use depending upon focus condition.

9. An in-focus detection apparatus as recited in claim 8, wherein
   said selection means selects the first frequency distribution at a point close to the in-focus point, and selects the second frequency distribution in a largely out of focus state.

10. An in-focus detection apparatus as recited in claim 9, wherein said selection means has a threshold value for determining which frequency distribution is to be used.

11. An in-focus detection apparatus, comprising:
    image sensing means for converting an object image formed by photographing optical system into an electrical image signal;
    contrast detection means for detecting the respective contrasts of the object at a plurality of points in a prescribed area of an image sensing plane to provide contrast data; and
    driving direction determining means for determining the direction of driving a focusing lens based on the distribution state of said contrast data.

12. An in-focus detection apparatuses as recited in claim 11, wherein
    said contrast is a time width from a peak of the image signal output from said image sensing means to a point where a luminance difference reaches a prescribed value, and
the distribution state of said contrast data is the frequency distribution of the detected time width and frequencies.

13. An in-focus detection apparatus, comprising:
imaging sensing means for converting an object image formed by a photographing optical system into an electrical image signal;
contrast detecting means for detecting contrasts of said object in a prescribed area of an image sensing plane based on said image signal;
peak judging means for judging whether the detected contrast is a peak;
edge width detection means for detecting a plurality of edge widths of the object in said prescribed area to provide edge width data;
frequency distribution producing means for producing a frequency distribution from the edge widths and frequencies based on said detected edge width data and outputting a representative value in the distribution as an evaluation value for an in-focus determination;
comparison means for comparing said representative value to a prescribed value for in-focus determination; and
in-focus determination means for determining that an in-focus state is reached or not based on the outputs of both said comparison means and peak judging means.

14. An in-focus detection apparatus as recited in claim 13, wherein
said in-focus determination means does not make an in-focus determination if the comparison result from said comparison means indicates that said representative value is not less than said prescribed value even with said peak judging means judging that the present contrast is the peak.

15. An in-focus detection apparatus, comprising:
image sensing means for converting an object image formed by a photographing optical system into an electrical image signal;
image sensing plane dividing means for dividing an image sensing plane into a plurality of small areas;
edge width detection means for detecting the edge widths of the object and the total number of edges for every small area, based on said image signal;
a first weighting coefficient output means for outputting a first weighting coefficient in accordance with the position of each small area in the image sensing plane;
a second weighting coefficient output means for outputting a second weighting coefficient in accordance with edge width data in each small area;
multiplication means for calculating the product of the edge total number × the first weighting coefficient × the second weighting coefficient for every small area; and
focus detection area determination means for determining where the focus detection area is placed in said image sensing plane based on the products for said small areas.

16. An in-focus detection apparatus as recited in claim 15, wherein
the value of said first weighting coefficient is largest in the central area in said image sensing plane, and decreases as a function of distance from the center.

17. An in-focus detection apparatus as recited in claim 15, wherein
the value of said first weighting coefficient is largest at the position of a previously set focus detection area and decreases as a function of distance from the previous focus detection area.

18. An in-focus detection apparatus as recited in claim 15, wherein the smaller the detected edge width is, the larger said second weighting coefficient becomes.

19. An in-focus detection apparatus as recited in claim 15, wherein said first weighting coefficient decreases as a function of distance from the center of said image sensing plane when said focus detection area is set for the first time, and decreases as a function of distance from the focus detection area previously set when the focus detection area is set for the second time and afterward.

20. An in-focus detection apparatus as recited in claim 15, further comprising frequency distribution producing means for producing a frequency distribution from the edge widths and frequencies based on the detected edge width data and outputting a representative value in the distribution as an evaluation value for in-focus determination,
the smaller the representative value of the edge width data, the larger said second weighting coefficient becoming.

21. An in-focus detection apparatus, comprising:
image sensing means for converting an object image formed by a photographing optical system into an electrical image signal;
image sensing plane division means for dividing the image sensing plane into a plurality of small areas;
edge width detection means for detecting the edge widths of the object for every small area based on said image signal; and
focus point detection area determination means for determining where the focus detection area is placed in said image sensing plane, based on the edge width data for every small area detected by said edge width detection means.

22. An in-focus detection apparatus as recited in claim 21, further comprising weighting coefficient output means for outputting a weighting coefficient in accordance with edge width data in each of the small areas, said focus detection area determination means determining said focus detection area based on said weighting coefficient.

23. An in-focus detection apparatus as recited in claim 22, further comprising frequency distribution producing means for producing a frequency distribution from the edge widths and frequencies, based on the detected edge width data and outputting a representative value in the distribution,
said weighting coefficient output means setting the weighting coefficient based on the representative value.

* * * * *